(12) United States Patent
Gotou et al.

(10) Patent No.: US 8,550,687 B2
(45) Date of Patent: Oct. 8, 2013

(54) LIGHT GUIDE PLATE, SURFACE LIGHT SOURCE DEVICE AND TRANSMISSIVE DISPLAY APPARATUS

(75) Inventors: Masahiro Gotou, Tokyo (JP); Hiroshi Sekiguchi, Tokyo (JP); Hiroshi Yamamoto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 91 days.

(21) Appl. No.: 13/357,931

(22) Filed: Jan. 25, 2012

(65) Prior Publication Data

US 2012/0201045 A1 Aug. 9, 2012

(30) Foreign Application Priority Data

Feb. 8, 2011 (JP) ................................. 2011-025454

(51) Int. Cl.
*F21V 8/00* (2006.01)
*G02B 6/00* (2006.01)
*G02B 6/42* (2006.01)

(52) U.S. Cl.
USPC ............. 362/626; 362/623; 362/615; 349/65

(58) Field of Classification Search
USPC ............................ 362/615–629; 349/62–67
See application file for complete search history.

(56) References Cited

U.S. PATENT DOCUMENTS

| 5,506,929 A * | 4/1996 | Tai et al. ........................ 385/146 |
| 5,704,703 A * | 1/1998 | Yamada et al. ............... 362/613 |
| 6,259,854 B1 * | 7/2001 | Shinji et al. ................... 362/625 |
| 2004/0022515 A1 * | 2/2004 | Sugiura et al. ................ 349/65 |
| 2007/0189033 A1 * | 8/2007 | Watanabe et al. ............ 362/606 |
| 2008/0319715 A1 * | 12/2008 | Kim et al. ...................... 359/599 |

FOREIGN PATENT DOCUMENTS

| JP | 09-043433 A | 2/1997 |
| JP | 2007-227405 A | 9/2007 |

* cited by examiner

*Primary Examiner* — Mariceli Santiago
(74) *Attorney, Agent, or Firm* — Edwards Wildman Palmer LLP; Peter C. Schechter; Junko Harada

(57) ABSTRACT

A light guide plate shaped substantially like a plate includes a light incident surface, a light exit surface and a reflective surface, which is opposite to the light exit surface, configured to reflect light toward the light exit surface. A plurality of optical units is arranged along the reflective surface in a direction orthogonal to the light incident surface. Each optical unit is shaped substantially like a quadratic prism that is convex toward the reflective surface and has a top surface and two slopes being formed opposite to each other with respect to the top surface. A dimension of the top surface is constant in a direction of arrangement of the optical units and an interval between adjacent optical units becomes greater as the adjacent optical units lie further away from the light incident surface in the direction of arrangement of the optical units.

8 Claims, 9 Drawing Sheets

LEFT-RIGHT DIRECTION

LIGHT INCIDENT
SURFACE SIDE ⟷ OPPOSITE
SURFACE SIDE
VERTICAL
DIRECTION

LIGHT INCIDENT SURFACE SIDE ←→ OPPOSITE SURFACE SIDE
VERTICAL DIRECTION

LIGHT INCIDENT SURFACE SIDE ←→ OPPOSITE SURFACE SIDE
VERTICAL DIRECTION

LIGHT GUIDE PLATE, SURFACE LIGHT SOURCE DEVICE AND TRANSMISSIVE DISPLAY APPARATUS

This application is based on and claims the benefit of priority from Japanese Patent Application No. 2011-025454, filed on 8 Feb. 2011, the content of which is incorporated herein by reference.

BACKGROUND OF THE INVENTION

1. Field of the Invention

The present invention relates to a light guide plate, and a surface light source device and a transmissive display apparatus that are provided with the light guide plate.

2. Related Art

A transmissive display apparatus has been known that displays an image by illuminating a transmissive display unit such as a Liquid Crystal Display (LCD) panel from a backside thereof by a surface light source device (back light). Surface light source devices can be roughly classified into a direct lighting type in which a light source is disposed directly below an optical member and an edge lighting type in which a light source is disposed on a side of an optical member. A surface light source device of the edge lighting type has been widely used recently, which can reduce thickness thereof compared to the direct lighting type through disposing the light source on a side of the optical member.

In the surface light source device of the edge lighting type, a light source is disposed at a position facing a side face (a light incident surface) of a light guide plate. Light emitted by the light source is incident upon the light guide plate from the light incident surface and travels in a direction (light guiding direction) substantially orthogonal to the light incident surface while being repeatedly reflected by the light guide plate and a reflective surface facing the light guide plate. By changing a traveling direction of the light by means of diffusion patterns and the like provided on the reflective surface of the light guide plate, the light gradually exits toward an LCD panel from the light exit surface, positions along the light guiding direction (for example, see Cited Publications 1 and 2).

Patent Document 1: Japanese Unexamined Patent Application Publication No. H9-43433

Patent Document 1: Japanese Unexamined Patent Application Publication No. 2007-227405

SUMMARY OF THE INVENTION

However, the conventional surface light source device of the edge lighting type tends to be brighter on the light source side and darker as being away from the light source in the light guiding direction, since an amount of light emitted in the light guiding direction is not sufficiently uniform. Such unevenness of light intensity leads to unevenness of brightness of an image displayed on the transmissive display apparatus, causing a deterioration of the image.

In the light guide plates disclosed in Patent Documents 1 and 2, diffusion patterns for diffusing light are provided on a reflective surface thereof. However, in such a light guide plate with the diffusion patterns, light exits after being diffusely reflected on the reflective surface, leading to problems of reduced convergence of the light and reduced front surface brightness. In addition, such a light guide plate having a wedge cross-section in which thickness is greater on the light source side and decreases in the light guiding direction, the thickness of the light guide plate on the light source side prohibits further reduction of thickness of the surface light source device and the transmissive display apparatus. Patent Documents 1 and 2 do not disclose the simultaneous realization of thickness reduction and in-plane uniformity of brightness.

A problem to be solved by the present invention is to provide a light guide plate with high in-plane uniformity of brightness and high light convergence that facilitates a further reduction in thickness, and a surface light source device and a transmissive display apparatus provided with this light guide plate.

The present invention solves the abovementioned problem by the following solutions. Although reference symbols corresponding to an embodiment of the present invention are employed, the present invention is not limited thereto.

In an aspect of the present invention, a light guide plate (13, 23, 33, 43) shaped substantially like a plate is provided, which includes a light incident surface (13a, 33a, 33b), a light exit surface (13c) and a reflective surface (13d, 23d, 33d, 43d). Light is incident on the light incident surface. The light exit surface, which is substantially orthogonal to the light incident surface, is configured to allow the light to exit. The reflective surface, which is substantially orthogonal to the light incident surface and opposite to the light exit surface, is configured to reflect the light toward the light exit surface. A plurality of optical units (132, 232, 332, 432) is arranged along the reflective surface in a direction orthogonal to the light incident surface. Each of the optical units is shaped substantially like a quadratic prism convex toward the reflective surface and has a top surface (133, 233, 333, 433) and two slopes (134, 135, 234, 235, 334, 335, 434, 435) being opposite to each other with respect to the top surface. A dimension (w) of the top surface is configured to be constant in a direction of arrangement of the optical units. An interval (P2, P3) between adjacent optical units becomes greater as the adjacent optical units lie further away from the light incident surface in the direction of arrangement of the optical units.

In a second aspect of the present invention, the light guide plate (13, 23, 33, 43) according to the first aspect is provided, in which an angle (α) between a slope (135, 235, 335, 435) of an optical unit (132, 232, 332, 432) on a side opposite to the light incident surface (13a, 33a, 33b) and a sheet surface of the light guide plate is no less than 0.3 degrees and no greater than 3.0 degrees, where the sheet surface extends horizontally with respect to the light guide plate.

In a third aspect of the present invention, the light guide plate (13, 23, 33, 43) according to the first aspect is provided, in which a ratio of the dimension (w) of the top surface (133, 233, 333, 433) in the direction of arrangement of the optical units to the interval (P2, P3) between the adjacent optical units is no less than 0.1 and no greater than 0.8.

In a forth aspect of the present invention, the light guide plate (13, 23, 33, 43) according to the first aspect is provided, in which a plurality of prisms (131) shaped substantially like a triangular prism is arranged on the light exit surface (13c) in a direction orthogonal to the direction of arrangement of the optical units (132, 232, 332, 432).

In a fifth aspect of the present invention, a surface light source device (10, 30) is provided, which includes the light guide plate (13, 23, 33, 43) according to the first aspect, a light source unit (12, 32A, 32B) and a prism sheet (14). The light source unit is disposed opposite to the light incident surface (13a, 33a, 33b). The prism sheet is provided on a light exit surface side of the light guide plate. A plurality of prisms (141) that is convex toward the light guide plate is arranged on the prism sheet in a direction parallel to the direction of arrangement of the optical units.

In a sixth aspect of the present invention, the surface light source device (10) according to the fifth aspect is provided, in which the light source unit (12) is single, a groove formed between the adjacent optical units (232) is asymmetric in the direction of arrangement of the optical units and between the two slopes (234, 235) opposite to each other with respect to the top surface (233), one slope (234) on the light incident surface side is smaller in dimension in the direction of arrangement of the optical units than another slope (235) on an opposite side.

In a seventh aspect of the present invention, the surface light source device (30) according to the fifth aspect is provided, which further includes another light source unit (32B). A face of the light guide plate facing the light incident surface is another light incident surface (33b). The other light source unit is disposed opposite to the other light incident surface. A groove formed between the adjacent optical units (332) is symmetric in the direction of arrangement of the optical units.

In an eight aspect of the present invention, a transmissive display apparatus (1, 3) is provided, which includes the surface light source device (10, 30) according to the fifth aspect and a transmissive display unit (11) that is illuminated by the surface light source device from a backside thereof.

The present invention provides the following effects.

(1) The light guide plate according to the present invention is substantially planar, in which: the reflective surface is provided with the plurality of optical units arranged in the direction orthogonal to the light incident surface; each optical unit is shaped substantially like a quadratic prism that is convex toward the reflective surface and has the top surface and the two slopes being formed opposite to each other with respect to the top surface; the dimension of the top surface is constant in the direction of arrangement of the optical units; and the interval between the adjacent optical units becomes greater as the adjacent optical units lie further away from the light incident surface in the direction of arrangement of the optical units.

As a result, an amount of exit light is maintained uniform in the arrangement direction, thereby increasing the in-plane uniformity of brightness. In addition, since diffusion patterns or the like are not employed on the reflective surface and the light is reflected by the slopes, it is possible to increase the convergence of the light exiting from the light exit surface in the direction of arrangement of the optical units. Furthermore, since the interval of arrangement is changed, it is possible to decrease a Moire phenomenon, which is often caused by layered optical sheets as much as possible. Moreover, as the light guide plate is substantially planar, it is possible to render a surface light source device and a display apparatus provided with the light guide plate to be thinner, compared to a light guide plate shaped like a wedge which changes its thickness to a considerable degree.

(2) In the light guide plate, since the angle between the slope of the optical unit on the side opposite to the light incident surface and the sheet surface of the light guide plate is no less than 0.3 degrees and no greater than 3.0 degrees. As a result, it is possible to render the amount of exit light to be uniform in the arrangement direction, thereby increasing the in-plane uniformity of brightness and the convergence of light exiting from the light exit surface.

(3) In the light guide plate, the ratio of the dimension of the top surface in the direction of arrangement of the optical units to the interval between the adjacent optical units is no less than 0.1 and no greater than 0.8. As a result, it is possible to render the amount of exiting light to be uniform in the arrangement direction, thereby increasing the in-plane uniformity of brightness and the convergence of light exiting from the light exit surface.

(4) In the light guide plate, the light exit surface is provided with the plurality of prisms in a substantially triangular prism shape arranged in the direction orthogonal to the arrangement direction of the optical units. As a result, the convergence of light in the arrangement direction of the prisms (direction orthogonal to the arrangement direction of the optical units) can be increased, thereby increasing the brightness in a front surface direction.

(5) The surface light source device includes the light guide plate according to the present invention, the light source unit disposed opposite to the light incident surface, and the prism sheet provided on the light exit surface side of the light guide plate. The plurality of prisms that is convex toward the light guide plate is arranged on the prism sheet in the direction parallel to the direction of arrangement of the optical units. As a result, it is possible to implement lighting in which the front surface brightness is high, the in-plane uniformity of brightness is high, and a Moire phenomenon is reduced as much as possible. In addition, the surface-light source device can be reduced in thickness.

(6) In the surface light source device: The light source unit is single. The groove formed between the adjacent optical units is asymmetric in the direction of arrangement of the optical units. In addition, between the two slopes opposite to each other with respect to the top surface, one slope on the light incident surface side is smaller in dimension in the direction of arrangement of the optical units than another slope on an opposite side. As a result, it is possible to decrease the amount of light reflected on the light incident surface side, effectively improve the uniformity of brightness, thereby realizing lighting in which the front surface brightness is high.

(7) The surface light source device includes the other light source unit. The face of the light guide plate facing the light incident surface is another light incident surface. The other light source unit is disposed opposite to the other light incident surface. The groove formed between the adjacent optical units is symmetric in the direction of arrangement of the optical units. As a result, in a case of the surface light source device having two lamps, it is possible to perform desirable lighting in which the front surface brightness is high and the in-plane uniformity of brightness is high.

(8) Since the transmissive display apparatus includes the surface light source device according to the present invention and the transmissive display unit that is illuminated by the surface light source device from the backside, it is possible to provide a display of a superior image in which the front surface brightness is high, the in-plane uniformity of brightness is high, and the Moire phenomenon is reduced as much as possible. In addition, the transmissive display apparatus can be reduced in thickness.

DETAILED DESCRIPTION OF THE INVENTION

Embodiments of the present invention are described hereinafter with reference to the drawings.

The drawings shown below are schematic views, in which a size and shape of each member is exaggerated accordingly, for the sake of easy understanding.

It should be noted that the terms "plate," "sheet" and "films" are generally used to indicate thicknesses in descending order, and they are used in the similar manner herein. However, such classification of terms is not mandatory and these terms may be used interchangeably as appropriate. For example, a light guide plate may be referred to as a light guide sheet or a light guide film.

In addition, values for dimensions and the like of members and material names recited herein are mere examples as an embodiment. The present invention is not limited thereto and appropriate selection may be employed for them.

FIRST EMBODIMENT

Figure 1A:
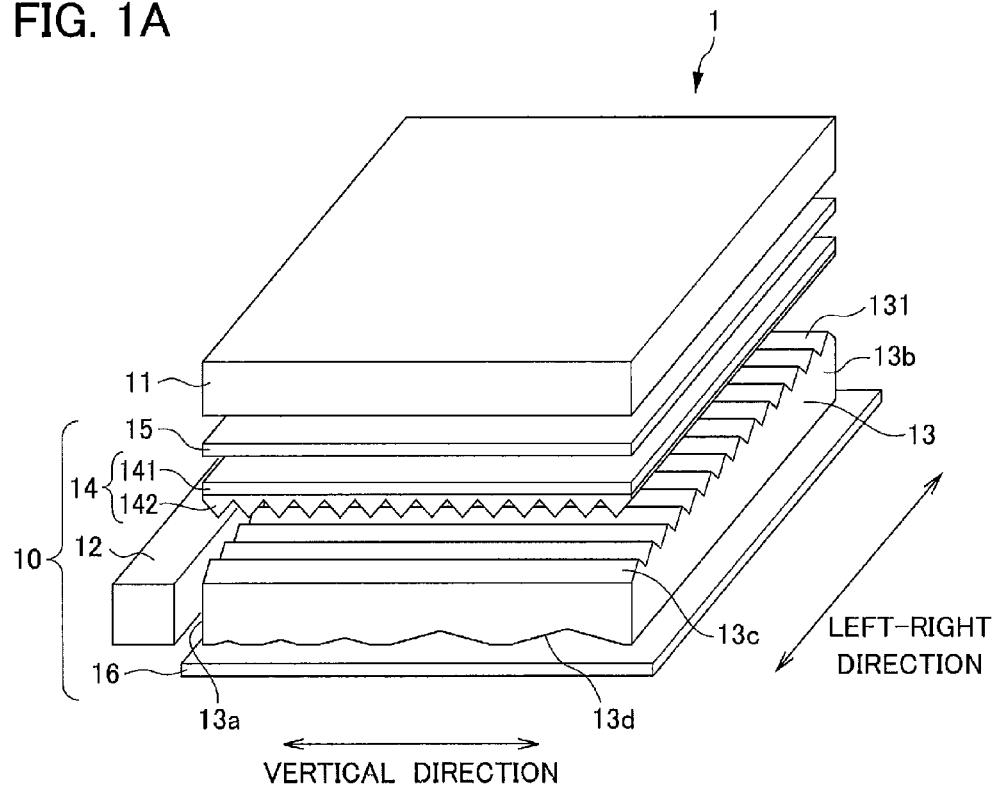
FIGS. 1A and 1B are diagrams each illustrating a configuration of a display apparatus and a surface light source device according to a first embodiment.
Figure 1B:
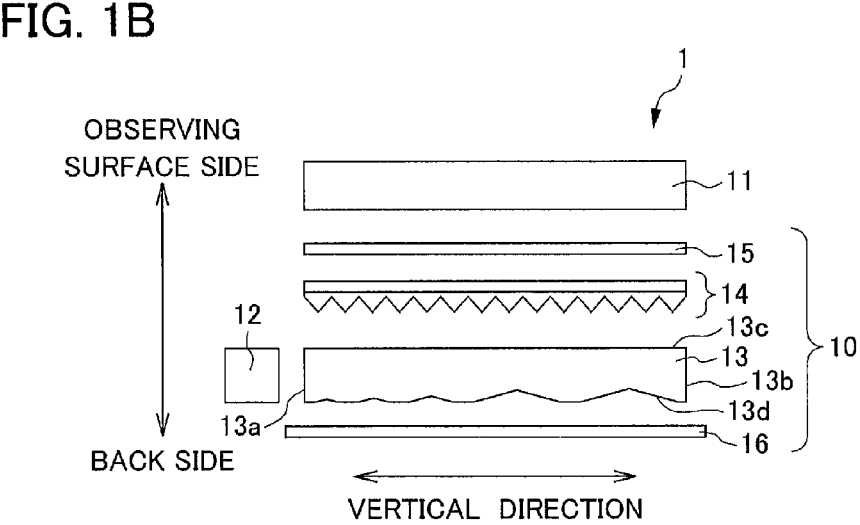

FIG. 1 is a diagram illustrating a configuration of a display apparatus 1 and a surface light source device 100 according to a first embodiment. FIG. 1A is a perspective view of the display apparatus 1 and the surface light source device 10 according to the first embodiment; and FIG. 1B is a cross-sectional view of the display apparatus 1 and the surface light source device 10 according to the first embodiment.

The display apparatus 1 is a liquid crystal transmissive display apparatus including a Liquid Crystal Display (LCD) panel 11, a light source unit 12, a light guide plate 13, a prism sheet 14, a light diffusive sheet 15, a reflector 16 and the like. In the display apparatus 1, image information formed on the LCD panel 11 is displayed by illuminating the LCD panel 11 from behind. In the display apparatus 1, the light source unit 12, the light guide plate 13, the prism sheet 14, the light diffusive sheet 15 and the reflector 16 together correspond to the surface light source device 10 that illuminates the LCD panel 11 from behind.

The LCD panel 11 is a transmissive display unit formed of transmissive liquid crystal display elements. The LCD panel 11 is a substantially rectangular and planar member and, for example, may have a screen size of 32-inch diagonal (740 mm×420 mm) and the resolution of 1280×768 pixels.

In the present embodiment, a viewing screen of the display apparatus 1 (LCD panel 11) is in a horizontally long rectangular shape. Here, in the display apparatus 1 in use, a direction parallel to a shorter side of the viewing screen is referred to as a vertical direction (perpendicular direction) and a direction parallel to a longer side is referred to as a left-right direction (horizontal direction). Unless otherwise specified, the vertical and left-right directions coincide with those of the display apparatus 1 and the surface light source device 10 when they are in use.

In addition, in a thickness direction of the display apparatus 1, a side of the LCD panel 11 is referred to as an observation surface side and a side of the reflector 16 is referred to as a back side.

The surface light source device 10 is a so-called edge lighting surface light source device (backlight) including the light source unit 12, the light guide plate 13, the prism sheet 14, the light diffusive sheet 15, the reflector 16 and the like.

The light source unit 12 emits light for illuminating the LCD panel 11. The light source unit 12 is provided at a position facing a light incident surface 13a, which is one end face of the light guide plate 13 in the vertical direction. The light source unit 12 of the present embodiment is described herein as being positioned on a lower side in the vertical direction with respect to the light guide plate 13, when the display apparatus 1 is in use. However, the light source unit 12 may also be positioned on an upper side or the like in the vertical direction.

The light source unit 12 uses a plurality of LED (Light Emitting Diode) light sources (not illustrated) of point light sources as a light source. The LED light sources are arranged at substantially regular intervals in the left-right direction along the light incident surface 13a. It may be alternatively possible that the light source unit 12 employs a linear light source such as a cold-cathode tube as the light source, or is configured with a light source disposed on an end face of a light guide that extends in the left-right direction. In addition, it may be possible that a reflector (not illustrated) is provided on a side opposite to the light guide plate 13 of the light source unit 12.

The light guide plate 13 is a substantially planar member that guides light.

The light guide plate 13 causes the light emitted from the light source unit 12 to enter the light incident surface 13a, and guides the light toward an opposite surface 13b while totally reflecting by a light exit surface 13c and a reflective surface 13d, causing the light to exit from the light exit surface 13c toward the LCD panel 11. In the light guide plate 13 of the present embodiment, the light mainly travels from the light incident surface 13a to the opposite surface 13b, along a direction orthogonal to the light incident surface 13a (vertical direction).

A plurality of prisms 131 is arranged on the light exit surface 13c of the light guide plate 13 in the left-right direction. In addition, a plurality of optical units 132 (see FIG. 2B) is arranged on the reflective surface 13d of the light guide plate 13 in the vertical direction that is orthogonal to the direction of arrangement of the prisms 131.

The light guide plate 13 of the present embodiment is made of light transmissive acrylic resin, and has a refractive index of 1.49. It should be noted that the light guide plate 13 is not limited thereto and may be alternatively made of PC (polycarbonate) resin, acrylonitrile resin, polyolefin resin, glass and the like.

The shape of the light guide plate 13 will be described later in detail.

The reflector 16 in a planar shape that reflects light is provided on a back side (an opposite side to the prism sheet 14) of the light guide plate 13 of the surface light source device 10.

The prism sheet 14 is an optical sheet disposed closer on the observation surface side (LCD panel 11 side) than the light guide plate 13. The prism sheet 14 has a function of collecting the light exiting from the light guide plate 13 in a front direction (direction orthogonal to a sheet surface).

The "sheet surface" indicates a surface of the prism sheet 14, the light guide plate 13 or the like in a planar direction of the prism sheet 14, the light guide plate 13 and the like. The "sheet surface" is consistently used in the specification and claims. For example, the sheet surface of the prism sheet 14 is a surface of the prism sheet 14 in the planar direction, in other words a surface parallel to the observation surface of the display apparatus 1.

The prism sheet 14 includes a base material layer 141 and a plurality of prisms 142 arranged on the base material layer 141 on a side thereof closer to the light guide plate 13.

The plurality of the prisms 142 is shaped substantially like a triangular prism that is convex toward the back side (light guide plate 13 side), and is arranged in the vertical direction so that a longitudinal direction thereof coincides with the left-right direction. The direction of arrangement of the prisms 142 is parallel to the direction of arrangement of the optical units 132 on the light guide plate 13.

The base material layer 141 is a layer on which the prisms 142 are formed.

The prism sheet 14 has the prisms 142 formed of an ionizing radiation curing resin such as an ultraviolet curing resin on one face of the base material layer 141.

The light diffusive sheet 15 is an optical sheet having a function of diffusing light. Although an example of disposing the light diffusive sheet 15 on an exit side of the prism sheet 14 (LCD panel 11 side), the present invention is not limited thereto and the light diffusive sheet 15 may be alternatively disposed on a light guide plate 13 side of the prism sheet 14. The light diffusive sheet 15 may be selected from among various general-purpose light-diffusive optical sheets, according to optical performances desired for the surface light source device 10 and the display apparatus 1, and according to characteristics of various optical sheets used in combination with the light guide plate 13.

With the light diffusive sheet 15, it is possible to decrease an effect of Moire phenomenon or the like occurring between the prisms 142 and pixels (not illustrated) of the LCD panel 11, and increase a view angle appropriately.

Figure 2A:
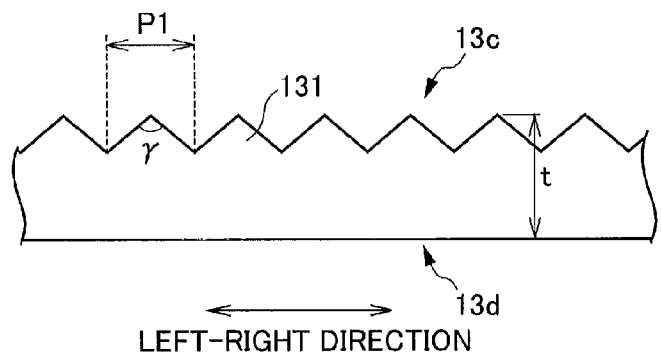
FIGS. 2A and 2B are diagrams each illustrating a shape of a light guide plate according to the first embodiment.
Figure 2B:
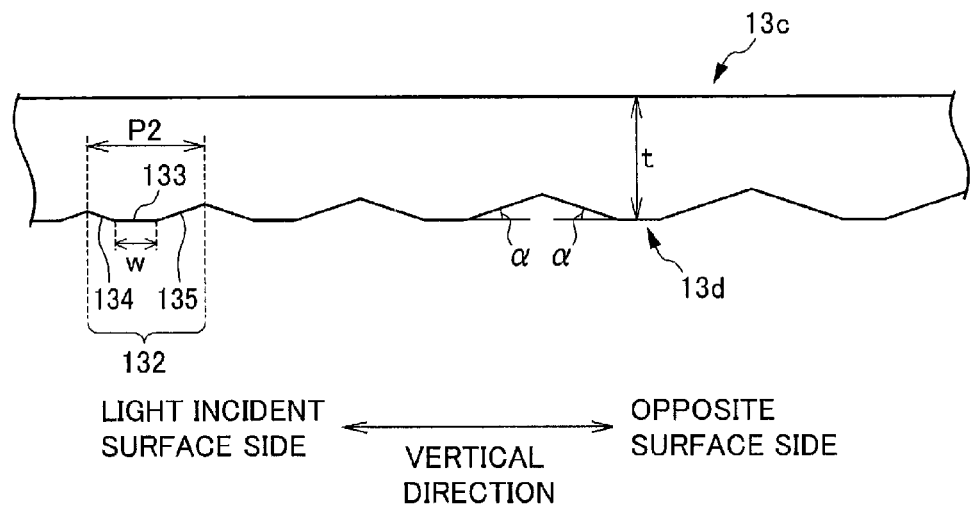

FIG. 2 is a diagram illustrating the shape of the light guide plate 13 according to the first embodiment. FIG. 2A is an enlarged view of a part of a cross-section that is orthogonal to the sheet surface of the light guide plate 13 and parallel to the left-right direction. FIG. 2B is an enlarged view of a part of the cross-section that is orthogonal to the sheet surface of the light guide plate 13 and parallel to the vertical direction.

As shown in FIGS. 1A, 1B and 2A, the plurality of prisms 131 convex in a direction of light exit is arranged on the light exit surface 13c of the light guide plate 13. Each of the prisms 131 is shaped substantially like an isosceles triangular prism with an apex angle of γ, and arranged in the left-right direction with a longitudinal direction thereof being directed in the vertical direction.

The apex angle γ of each prism 131 is in a range of 90 to 140 degrees, and an interval P1 of arrangement of the prisms 131 is in a range of 20 to 200 micron meters. The prisms 131 may be configured with a plurality of prisms of the same shape. It may alternatively be possible that prisms on the light incident surface 13a side are smaller in height than those on the opposite surface 13b side, or apex angles of prisms 131 on the light incident surface 13a side are greater than those on the opposite surface 13b side.

The plurality of optical units 132 is arranged on the reflective surface 13d of the light guide plate 13. Each of the optical units 132 is shaped substantially like a quadratic prism that is convex toward the back side (reflector 16 side), and is arranged in the vertical direction, with a longitudinal direction thereof being directed in the left-right direction.

A cross-section of each optical unit 132 parallel to the arrangement direction thereof and orthogonal to the sheet surface has a substantially trapezoidal shape. Each optical unit 132 has a substantially planar top surface 133 that is convex toward the back side and slopes 134, 135 formed on both sides with respect to the top surface 133. For the sake of easy understanding, one slope positioned on the light incident surface 13a side is referred to as a first slope 134, and another slope positioned on the opposite surface 13b side is referred to as a second slope 135.

The top surface 133 of each optical unit 132 is parallel to the sheet surface of the light guide plate 13. In addition, it may be preferable but not necessary that an angle α between the second slope 135 and the top surface 133 (sheet surface of the light guide plate 13) is in a range of 0.3 to 3.0 degrees ($0.3° \leq \alpha \leq 3.0°$). In the present embodiment, the angle α is 1.0 degree, for example, which is uniform regardless of the position of the optical unit 132 in the arrangement direction (light guiding direction). An angle between the first slope 134 and the top surface 133 in the present embodiment is equal to the angle α between the second slope 135 and the top surface 133, and uniform regardless of the position of the optical unit 132 in the arrangement direction.

Furthermore, in the present embodiment, a dimension t from an apex of a prism 131 to a top surface 133 in a thickness direction of the light guide plate 13 is 0.5 mm, which is uniform regardless of the position of the prism 131 in the arrangement direction.

As shown in FIG. 2, in each optical unit 132, a second slope 135 is greater in width than a first slope 134. A second slope 135 and a first slope 134 between adjacent optical units 132 have the same dimension, A space between the adjacent optical units 132 is a V-shaped groove extending in the left-right direction when seen from the reflective surface 13d side. The groove is shaped symmetric in the direction of arrangement of the optical units 132.

The interval P2 of arrangement of the optical units 132 gradually increases in the arrangement direction (light guiding direction) from the light source unit 12 (light incident surface 13a) to the opposite surface 13b. On the other hand, a dimension w of a top surface 133 in the arrangement direction is uniform regardless of the position of an optical unit 132 in the arrangement direction. Accordingly, the optical unit 132 increases dimensions of the slopes 134, 135 gradually as it moves away from the light source unit 12 (light incident surface 13a) and approaches the opposite surface 13b in the direction of arrangement of the optical units 132 (light guiding direction). In the present embodiment, the dimension w of the top surface 133 is 20 micron meters. The interval P2 of arrangement of the optical units 132 is 50 micron meters in the vicinity of the light incident surface 13a and 150 micron meters in the vicinity of the opposite surface 13b.

It may be preferable but not necessary that the optical units 132 satisfy a ratio w/P2: $0.1 \leq w/P2 \leq 0.8$, which is a ratio of the dimension w to the interval of arrangement P2. In a case of the light guide plate 13 of the present embodiment, the ratio of w/P2 is equal to 0.4 for an optical unit 132 in the vicinity of the light incident surface 13a (light source unit 12), and approximately equal to 0.13 for an optical unit 132 in the vicinity of the opposite surface 13b.

The light guide plate 13 is formed of the abovementioned acrylic resin, PC resin or the like by extrusion method. Injection method, casting method and the like may alternatively be used. A forming die for forming the optical units 132 is formed by machining or the like.

Figure 3:
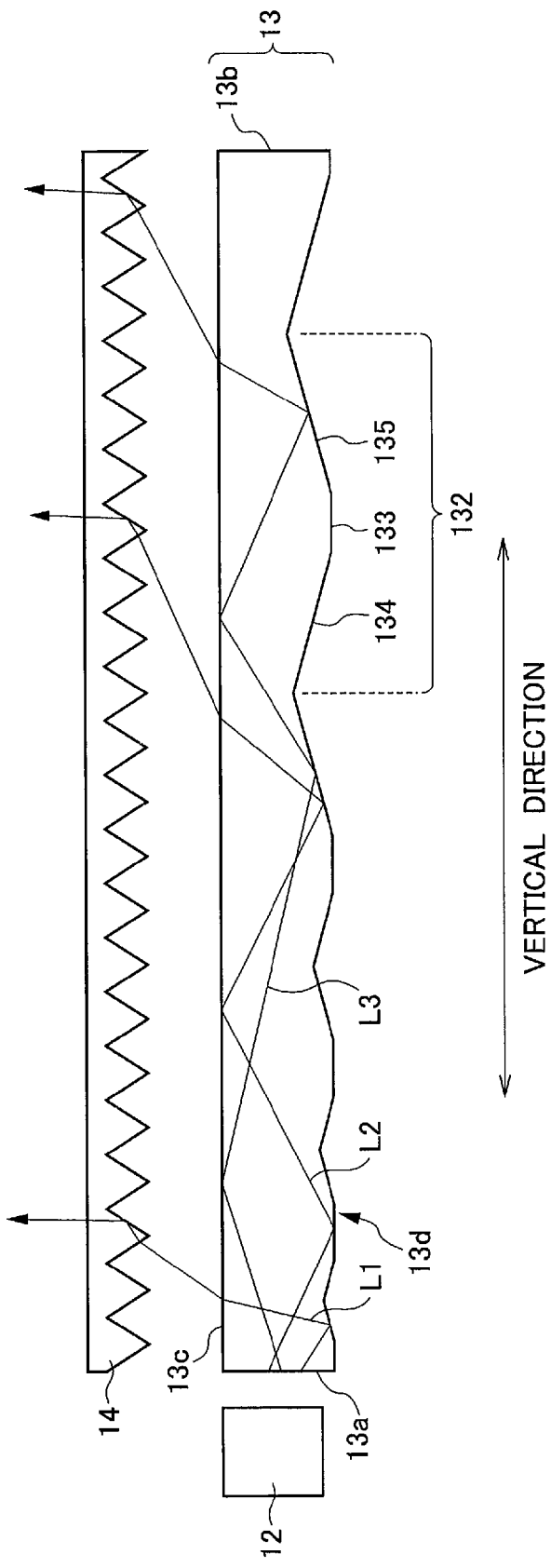
FIG. 3 is a diagram illustrating light traveling in the light guide plate according to the first embodiment.

FIG. 3 is a diagram illustrating light traveling in the light guide plate according to the first embodiment. In FIG. 3, a cross-section of the surface light source device 10 in the vertical direction is shown. In this figure, the light diffusive sheet 15, the reflector 16 and the like are omitted for the sake of easy understanding.

In general, in a substantially planar light guide plate with no optical units formed on the reflective surface, most of light incident upon a light incident surface from a light source unit exits in the vicinity of the light incident surface. Therefore, such a light guide plate tends to be brighter in the vicinity of the light incident surface and darker in the vicinity of an opposite face, thereby reducing the in-plane uniformity of brightness.

A light guide plate with diffusion patterns or the like provided on a reflective surface thereof is sometimes used for solving such non-uniformity. However, since in such a light guide plate with such diffusion patterns or the like, light is diffusely reflected on the diffusion patterns to exit from a light exit surface, the convergence of light will decrease. This may reduce the front surface brightness when such a light guide plate is used in a surface light source device and the like. In addition, since additional manufacturing steps are required for machining a forming die to form the diffusion patterns on the reflective surface and for machining the reflective surface, manufacturing cost and time have been increased, accordingly.

On the other hand, in the present embodiment, a part of the light incident upon the light guide plate 13 through the light incident surface 13a enters the light exit surface 13c at an angle smaller than a critical angle, and then exits from the light exit surface 13c. Remaining part of the light travels toward the opposite surface 13b while being totally reflected by the second slope 135, the top surface 133, the light exit surface 13c and the like (see light L1 to L3).

As the light exit surface 13c and the top surface 133 are parallel to each other in the present embodiment, an incident angle of the light with respect to the light exit surface 13c does not change when the light is totally reflected by the top surface 133. However, since the second slope 135 makes the angle α with respect to the top surface 133, the light totally reflected by the second slope 135 has an incident angle of the light with respect to the light exit surface 13c, which is smaller than an incident angle of the light before the total reflection by the second slope 135 (see the light L1 to L3).

If an incident angle of the light with respect to the light exit surface 13c after the total reflection by the second slope 135 is smaller than the critical angle, the light exits from the light exit surface 13c, enters the prism 142 on the prism sheet 14, and then exits substantially front in the arrangement direction (see the light L1, L2).

On the other hand, if an incident angle of the light with respect to the light exit surface 13c after the total reflection by the second slope 135 is greater than the critical angle, the light is totally reflected by the light exit surface 13c again and travels toward the reflective surface 13d (see the light L3). As the interval P2 of the optical units 132 gradually increases in the direction of arrangement of the optical units 132, the light is totally reflected by the second slopes 135 for several times as the light travels in the light guide plate 13, thereby gradually reducing an incident angle with respect to the light exit surface 13c.

As the light incident upon the light guide plate 13 travels in the light guide plate 13 toward the opposite surface 13b while being totally reflected by the light exit surface 13c, the top surface 133, the second slope 135 and the like, an incident angle thereof with respect to the light exit surface 13c varies. Accordingly, the light exits from the light exit surface 13c at a position where the light is incident upon the light exit surface 13c at an angle smaller than the critical angle (see the light L1 to L3).

The light exiting from the light exit surface 13c is subjected to light collection performed by the prisms 131 formed on the light exit surface 13c of the light guide plate 13 in the left-right direction.

As described above, it may be preferable but not necessary that the angle α between the second slope 135 and the top surface 133 (sheet surface of the light guide plate 13) satisfies: 0.3 degrees≤α≤3.0 degrees.

In a case of α<0.3 degrees, as an amount of change in an angle of the light totally reflected by the second slope 135 with respect to the sheet surface (light exit surface 13c) is small, the light continues travelling in the light guide plate 13 while being totally reflected by the light exit surface 13c and the like. Accordingly, an amount of light exiting from the light exit surface 13c decreases to result in a reduction in brightness.

In a case of α>3.0 degrees, since a range of exit angles in the vertical direction (direction of arrangement of the optical units 132) of the light exiting from the light exit surface 13c is broad, the convergence of light will decrease. As a result, since the light collection performed by the prisms 142 on the prism sheet 14 is insufficient, the performance associated with front light collection, as a surface light source device, with respect to the direction of arrangement of the optical units 132 and the prisms 142 will decrease. In addition, since the amount of light exiting in the vicinity of the light incident surface 13a increases, the light is not sufficiently guided to the opposite surface 13b, resulting in a reduction in the uniformity of brightness.

Therefore, it may be preferable but not necessary that the angle α between the second slope 135 and the top surface 133 (sheet surface of the light guide plate 13) satisfies: 0.3 degrees≤α≤3.0 degrees. The angle α of the light guide plate 13 of the present embodiment is 1.0 degree satisfying the preferred range. Accordingly it is possible to sufficiently guide the light incident from the light incident surface 13a to the opposite surface 13b, to render an amount of light exiting in the light guiding direction to be substantially uniform and to maintain a sufficient level of the convergence of light exiting from the light guide plate 13.

In the light guide plate 13 of the present embodiment, a proportion of the top surface 133 to the optical unit 132, in other words the ratio w/P2 of the dimension w of the top surface 133 to the interval P2, gradually decreases as the position of the optical unit 132 moves away from the light incident surface 13a and approaches the opposite surface 13b in the direction of arrangement of the optical units 132 (light guiding direction).

Light extraction efficiency (output efficiency) from the light guide plate 13 is positively correlated to a proportion of the slopes 134, 135 (especially the second slope 135) in the direction of arrangement of the optical units 132, in other words, negatively correlated to the ratio w/P2. Therefore, in the light guide plate 13 of the present embodiment, the light extraction efficiency is higher on the opposite surface 13b side, where the ratio w/P2 is smaller, than on the light incident surface 13a side, where the ratio w/P2 is greater. This is due to the fact that, if the ratio w/P2 is smaller, in other words an area of the slopes 134, 135 is greater, an amount of light reflected by the slopes increases (especially the second slope 135 contributes to light exiting from the light exit surface 13c).

In the light guide plate 13 of the present embodiment, the light extraction efficiency is lower on the light incident surface 13a side where an amount of light is greater, and the light extraction efficiency is higher on the opposite surface 13b side where an amount of light is smaller than the light incident surface 13a side, in the light guiding direction (direction of arrangement of the optical units 132). Accordingly, it is possible to render the amount of light exiting in the light guiding direction to be uniform and increase the uniformity of brightness.

It may be preferable but not necessary that in the optical units 132, the ratio w/P2 of the dimension w to the interval P2 is: $0.1 \leq w/P2 \leq 0.8$.

If the ratio w/P2 is less than 0.1, the area of the top surface 133, which is substantially parallel to the light exit surface 13c, is too large, thereby reducing the amount of light reflected by the slopes 134, 135. Since this deteriorates a light control function performed by the slopes (especially the second slope 135), the light extraction efficiency will decrease to result in an insufficient amount of light exit, as described above.

If the ratio w/P2 is greater than 0.8, the area of the slopes 134, 135 in the optical unit 132 is too large, thereby increasing the amount of light reflected by the slopes (especially the second slope 135). Since the amount of light exiting on the light incident surface 13a side increases, an amount of light is not sufficiently guided to the opposite surface 13b, so that the brightness is not uniform. If the angle α is increased for solving the non-uniformity of brightness, the convergence of light will decrease as described above.

Therefore, it may be preferable but not necessary that in the optical units 132, the ratio w/P2 of the dimension w of the top surface 133 to the interval of P2 in the arrangement direction is: $0.1 \leq w/P2 \leq 0.8$. In the light guide plate 13 of the present embodiment, the ratio w/P2 is equal to 0.4 on the light incident surface 13a side and the ratio w/P2 is approximately equal to 0.13 on the opposite surface 13b side, satisfying the preferred range.

Here, the surface light source device 10 of the present embodiment is compared to a surface light source device of a comparative example (not illustrated) in terms of a half-value angle of brightness distribution in the vertical direction (light guiding direction). The surface light source device of the comparative example is configured substantially similar to the surface light source device of the present embodiment, except for lacking the optical units and the prisms and having instead dots formed on a reflective surface, which provide a diffusion effect.

Half-value angles of the surface light source device 10 of the present embodiment and that of the surface light source device of the comparative example were obtained in the following manner: The light source unit 12 was illuminated by the surface light source device 10 of the present embodiment and that of the comparative example.

The brightness of each light exit angle in the vertical direction (light guiding direction) was measured in a dark-room environment using a goniophotometer (deviation luminance meter, manufactured by MURAKAMI COLOR RESEARCH LABORATORY). Comparison in half-value angles was performed between the present embodiment and the comparative example.

The half-value angle in the vertical direction (light guiding direction) of the surface light source device of the comparative example was approximately ±35 degrees. On the other hand, the half-value angle in the vertical direction (light guiding direction and the direction of arrangement of the optical units 132) of the surface light source device 10 of the present embodiment was approximately ±15 degrees. Therefore, the performance associated with light collection of the present embodiment was higher than the surface light source device of the comparative example.

For these results described above, it is possible for the present embodiment to provide the light guide plate 13 that causes not only an amount of exit light to be uniform in the light guiding direction, but also the convergence of light to be high. In this manner, it is possible for the present embodiment to provide the surface light source device 10 and the display apparatus 1 with the high in-plane uniformity of brightness and the high front surface brightness.

According to the present embodiment, the interval P2 of the optical units 132 is not constant. Accordingly, it is possible to decrease a Moire phenomenon as much as possible, which is likely to occur, when other optical members such as the prism sheet 14 on which pixels of the LCD panel 11 and the prisms 142 are arranged are layered on the light guide plate 13. This provides the surface light source device 10 in which the Moire phenomenon substantially is reduced, resulting in the display apparatus 1 that displays a high-quality image.

In a light guide plate with diffusion patterns or dimple patterns formed on a reflective surface thereof, since light is diffusely reflected by these patterns, the convergence of light may be deteriorated. On the other hand, the present embodiment in which light is totally reflected by the second slope 135 to exit from the light exit surface 13c realizes the high convergence of light.

Accordingly, it is possible for the present embodiment to increase the front surface brightness of the surface light source device 10 and the display apparatus 1. Furthermore, as the light guide plate 13 of the present embodiment is substantially planar, it is possible to further decrease the thickness of the surface light source device 10 and the display apparatus 1.

SECOND EMBODIMENT

Figure 4A:
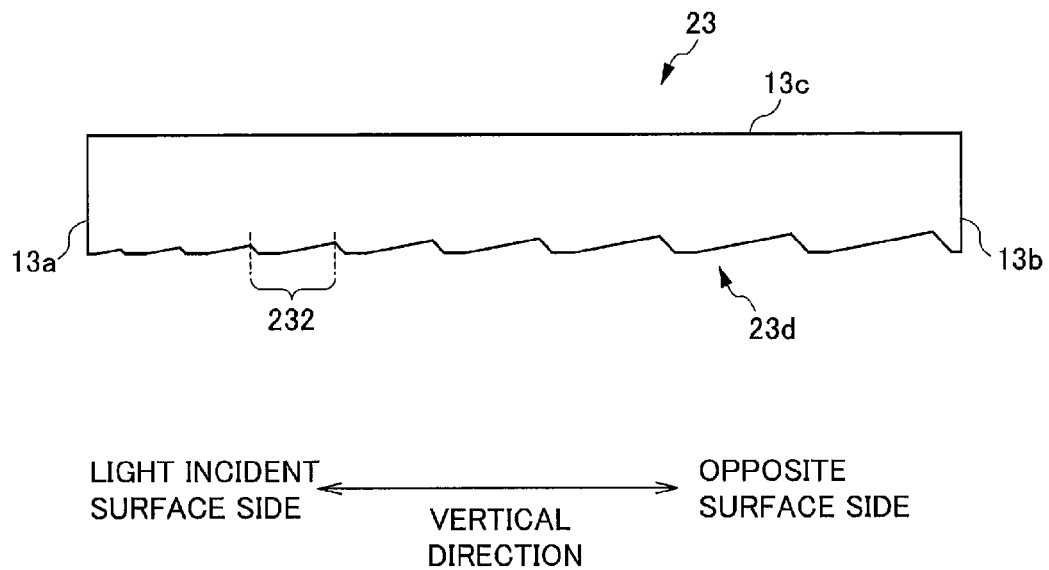
FIGS. 4A and 4B are diagrams each illustrating a shape of a light guide plate according to a second embodiment.
Figure 4B:
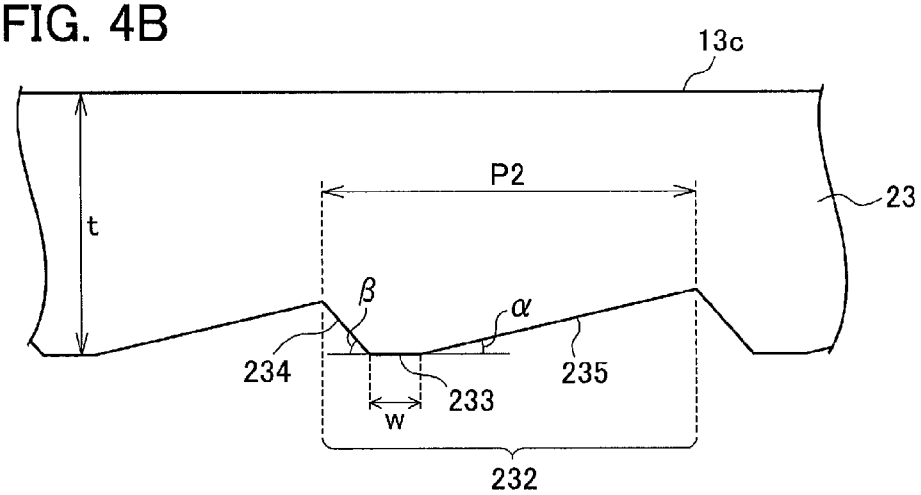

FIG. 4 is a diagram illustrating a shape of a light guide plate 23 according to a second embodiment. FIG. 4A is a diagram illustrating a cross-section that is orthogonal to a sheet surface of the light guide plate 23 and parallel to a direction of arrangement of optical units 232 (vertical direction); and FIG. 4B is an enlarged view of a part of the cross-section illustrated in FIG. 4A.

The light guide plate 23 of the second embodiment is configured substantially similar to the light guide plate 13 of the first embodiment, except that a shape of optical units 232 formed on a reflective surface 23d is different from that of the first embodiment. Therefore, portions having functions similar to the light guide plate 13 of the first embodiment are referred to by the same symbols or symbols bearing the same symbols in last part, and specific descriptions thereof are omitted accordingly.

In addition, the light guide plate 23 of the second embodiment is usable in the surface light source device 10 and the display apparatus 1 in place of the light guide plate 13 of the first embodiment.

The light guide plate 23 includes a light incident surface 13a, an opposite surface 13b, a light exit surface 13c, and a reflective surface 23d. On the light exit surface 13c of the light guide plate 23, a plurality of prisms 131 is arranged in a left-right direction.

On the reflective surface 23d of the light guide plate 23, a plurality of optical units 232 is formed. Each optical unit 232 is shaped substantially like a quadratic prism that is convex toward a back side, and is arranged in a vertical direction, with a longitudinal direction thereof being directed in the left-right direction.

Each optical unit 232 has a top surface 233 shaped substantially like a planar trapezoid that is convex toward the back side in a cross-section parallel to a direction of arrangement of the optical units 232 (light guiding direction) and orthogonal to a sheet surface, and slopes 234, 235 formed on both sides with respect to the top surface 233. For the sake of easy understanding, one slope positioned on the light incident surface 13a side is referred to as a first slope 234, and another slope positioned on the opposite surface 13b side is referred to as a second slope 235. An interval of arrangement of the optical units 232 is P2. The interval P2 gradually increases from the light incident surface 13a side to the opposite surface 13b side, and is 100 micron meters in the vicinity of the light incident surface 13a and 300 micron meters in the vicinity of the opposite surface 13b.

The top surface 233 is substantially parallel to the sheet surface of the light guide plate 13. A dimension (total thickness) t from an apex of a prism 131 to the top surface 233 in a thickness direction of the light guide plate 23 is uniform regardless of the position of the optical unit 232 in the direction of arrangement of the optical units 232 (light guiding direction). In the present embodiment, the dimension t is equal to 0.5 mm.

The dimension w of the top surface 233 in the direction of arrangement of the optical units 232 is uniform regardless of the position thereof in the arrangement direction. In the present embodiment, is the dimension w is equal to 50 micron meters.

It is preferable but not necessary that the optical units 232 satisfy a ratio w/P2 of the dimension w of the top surface 233 to the interval P2 in the arrangement direction: $0.1 \leq w/P2 \leq 0.8$. In the optical units 232 of the present embodiment, the ratio w/P2 is equal to 0.5 in the vicinity of the light incident surface 13a, and the ratio w/P2 is approximately equal to 0.17 in the vicinity of the opposite surface 13b, satisfying the preferred range.

It may also be preferable but not necessary that an angle α between the second slope 235 and the top surface 233 (sheet surface of the light guide plate 23) satisfies: $0.3$ degrees $\leq \alpha \leq 3.0$ degrees. In the present embodiment, the angle α is equal to 0.5 degrees regardless of the position of the optical unit 233 in the arrangement direction, satisfying the preferred range. An angle β between the first slope 234 and the top surface 233 is greater than the angle α between the second slope 235 and the top surface 233 ($\alpha < \beta$), and uniform regardless of the position thereof in the arrangement direction. It may be possible but not necessary that the angle β is not smaller than 43 degrees. In the present embodiment, β is equal to 70 degrees satisfying the preferred range.

As illustrated in FIG. 4, in the present embodiment, the width of the first slope 234 is smaller than the width of the second slope 235. In addition, a V-shaped groove between the optical units 232 has an asymmetric shape in the direction of arrangement of the optical units 232.

Figure 5A:
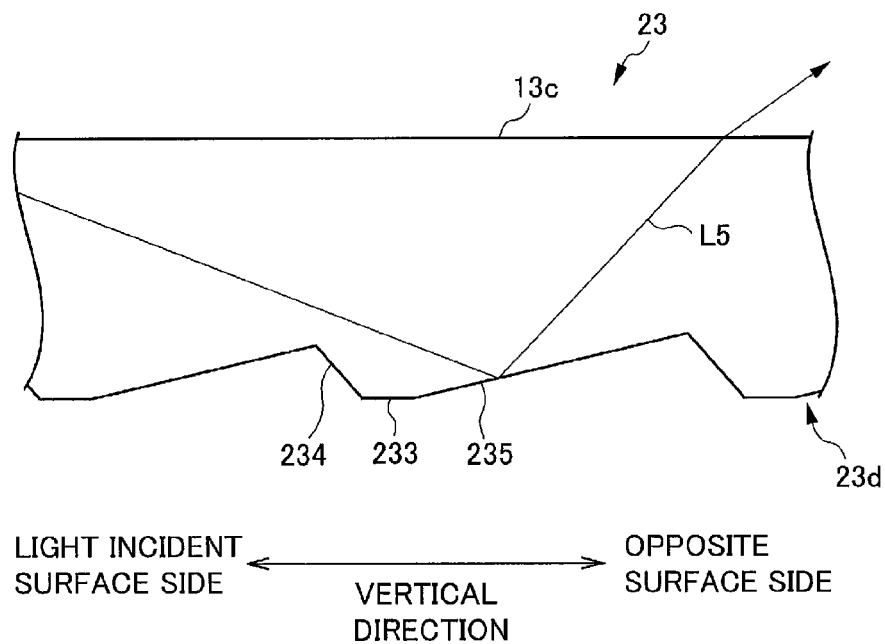
FIGS. 5A and 5B are diagrams each illustrating light on a reflective surface of the light guide plate according to the second embodiment.
Figure 5B:
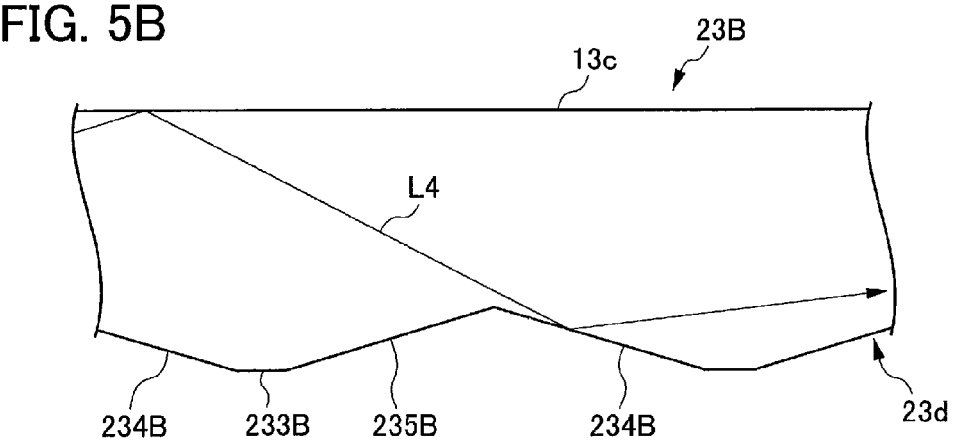

FIG. 5 is a diagram illustrating light on a reflective surface of the light guide plate 23 according to the second embodiment. FIG. 5A illustrates the light guide plate 23 of the present embodiment; and FIG. 5B illustrates a light guide plate 23B of a comparative example.

An optical unit formed on a reflective surface of the light guide plate of the comparative example includes a top surface 233B, a first slope 234B, and a second slope 235B. An inclined plane of the first slope 234B is directed toward the opposite surface 13b. As shown in FIG. 5B, if an angle between the first slope 234B and the top surface 233B (the sheet surface of the light guide plate 23B) is smaller than 43 degrees, light L4 travelling toward the opposite surface 13b while being totally reflected by the light exit surface 13c and the top surface 233B and the like tends to more easily impinge upon the first slope 234B. Accordingly, as shown in FIG. 5B, the direction of the light L4 changes such that the incident angle thereof with respect to the light exit surface 13c of the light guide plate 23B increases (to exceed a critical angle).

On the other hand, since the angle β between the first slope 234 and the top surface 233 is greater than α and $\beta \geq 43$ degrees in the present embodiment, an angle between the first slope 234 and the top surface 233 is greater than an angle of the light, which travels in the light guide plate 23 toward the reflective surface 23d, with respect to the top surface 233. Accordingly, as shown in FIG. 5A, it is possible to restrict light L5, which is totally reflected by the light exit surface 13c and travels toward the reflection surface 23d, from entering the first slope 234 as much as possible. In this manner, it is possible to remarkably decrease an amount of reflection occurring at the first slope 234.

Therefore, when the angle β satisfies $\alpha < \beta$ and $\beta \geq 43$ degrees simultaneously as in the present embodiment, it is possible to remarkably decrease an amount of the light reflected by the first slope 234 while travelling in the light guide plate 23 and increase an amount of light reflected by the second slope 235.

With the present embodiment, it is possible to render an amount of light exiting in the vertical direction (direction of arrangement of the optical units 232) of the light exit surface 13c to be further uniform, thereby providing the surface light source device 10 and the display apparatus 1 with the higher uniformity of brightness.

In addition, the present embodiment also provides a superior surface light source device and display apparatus in which a Moire phenomenon does not occur and a reduction in thickness thereof is realized.

THIRD EMBODIMENT

Figure 6A:
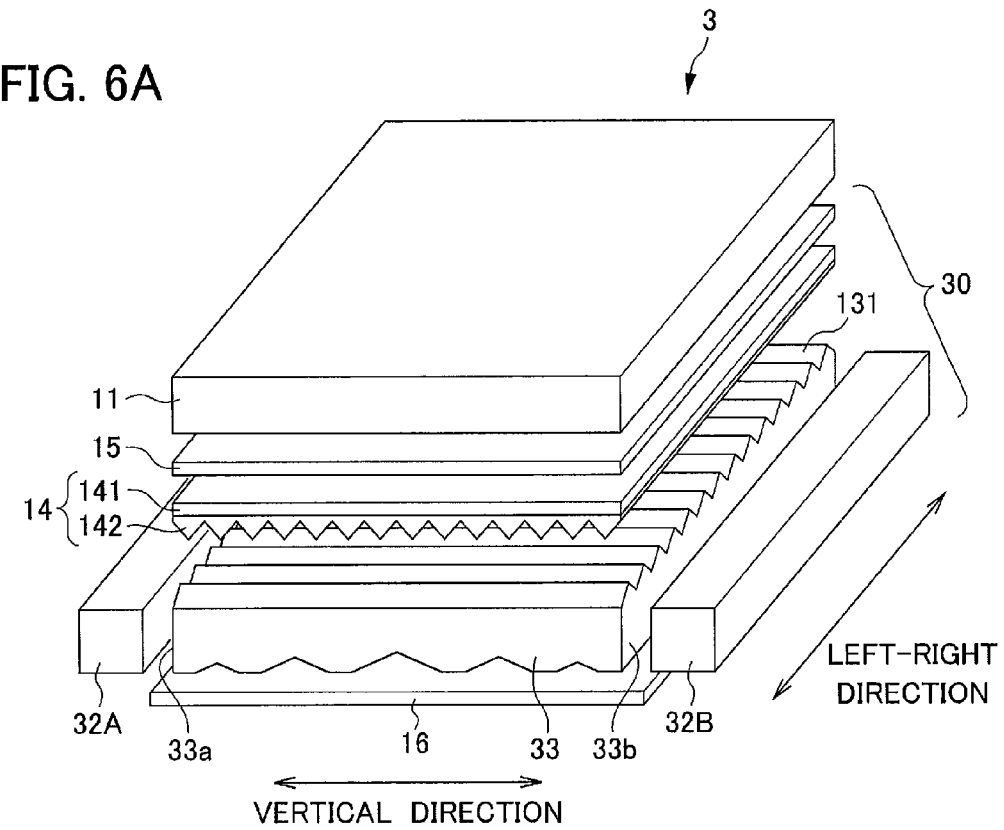
FIGS. 6A and 6B are diagrams each illustrating a display apparatus and a surface light source device according to a third embodiment.
Figure 6B:
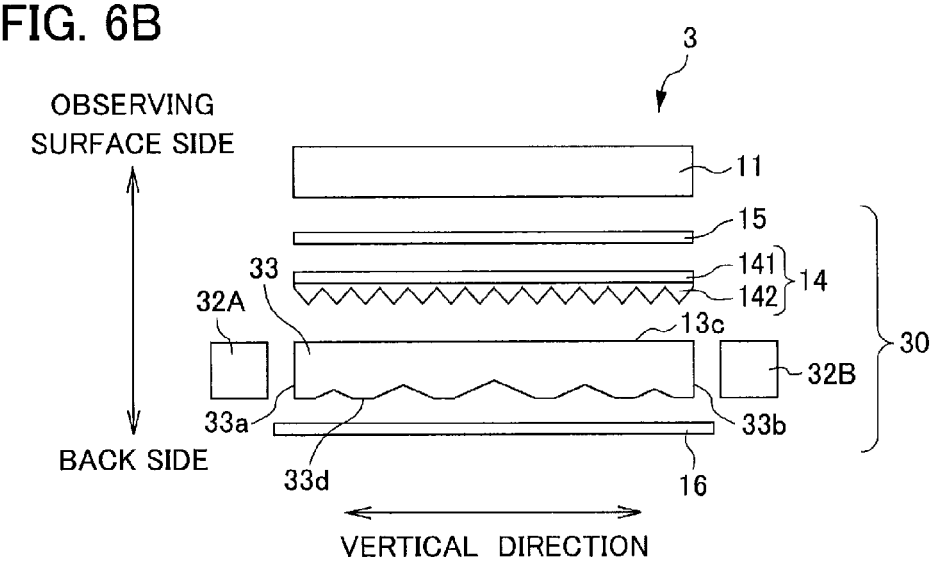

FIGS. 6A and 6B are diagrams each illustrating a display apparatus 3 and a surface light source device 30 according to a third embodiment. FIG. 6A is a perspective view of the display apparatus 3 and the surface light source device 30 according to the third embodiment; and FIG. 6B is a cross-sectional view of the display apparatus 3 and the surface light source device 30 according to the third embodiment.

The display apparatus 3 and the surface light source device 30 are configured substantially similar to the display apparatus 1 and the surface light source device 10 of the first embodiment except for two light source units 32A, 32B and a light guide plate 33. Therefore, portions with similar functions to the first embodiment are referred to by the same symbols or symbols bearing the same symbols in last part, and specific descriptions thereof are omitted accordingly.

The display apparatus 3 is provided with an LCD panel 11 and the surface light source device 30.

The surface light source device 30 includes the light source units 32A, 32B, the light guide plate 33, a prism sheet 14, a light diffusive sheet 15, a reflector 16 and the like.

The light source units 32A, 32B are disposed opposite to both side faces of the light guide plate 33 in a vertical direction. The light source unit 12 of the first embodiment may be used for the light source units 32A, 32B.

Figure 7:
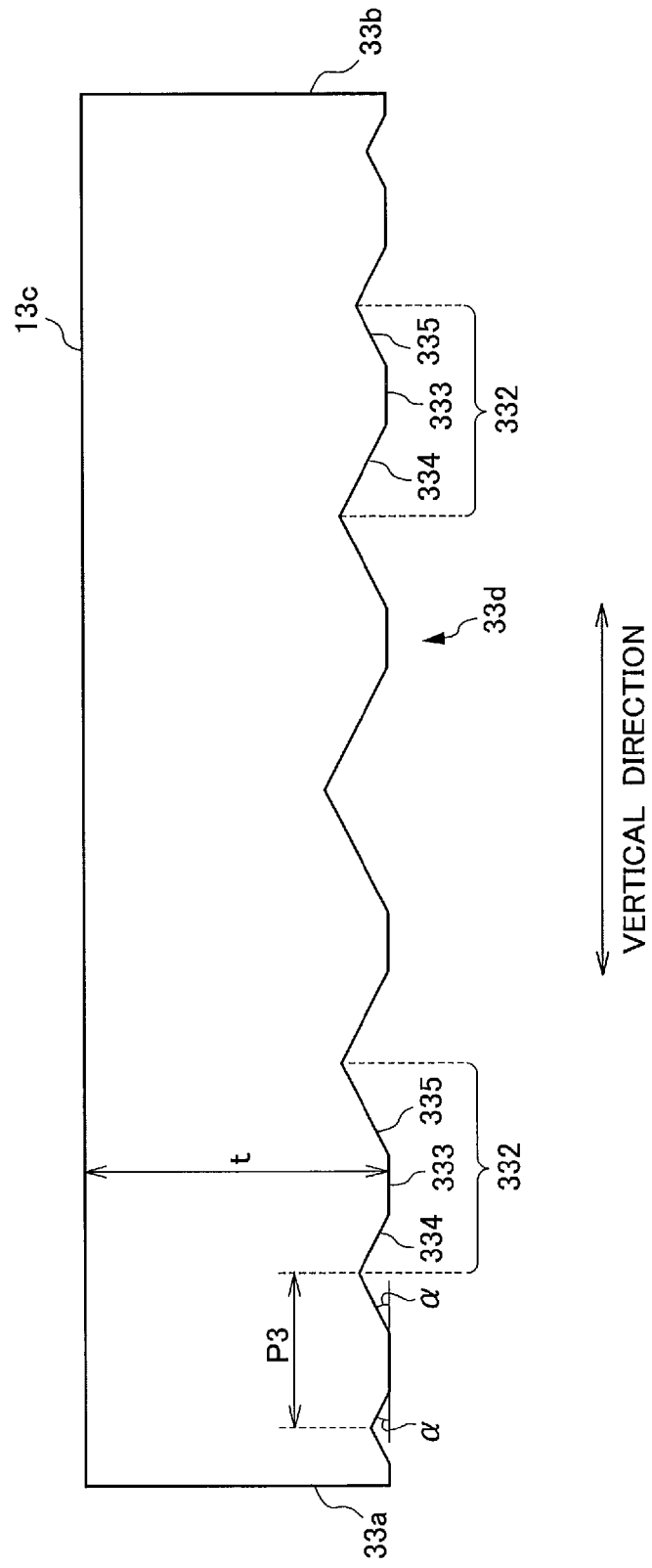
FIG. 7 is a diagram illustrating a shape of a light guide plate according to the third embodiment.

FIG. 7 is a diagram illustrating a shape of the light guide plate 33 according to the third embodiment. FIG. 7 illustrates a cross-section of the light guide plate 33 that is parallel to the vertical direction and orthogonal to a sheet surface.

The light guide plate 33 includes light incident surfaces 33a, 33b, a light exit surface 13c, and a reflective surface 33d.

The light incident surfaces 33a, 33b are both side faces of the light guide plate 33 in the vertical direction, and disposed opposite to each other. Light from the light source units 32A, 32B is incident upon these light incident surfaces 33a, 33b.

A plurality of prisms 131 is arranged on the light exit surface 13c in a left-right direction. A plurality of optical units 332 is arranged on the reflective surface 33d.

Each optical unit 332 is shaped substantially like a quadratic prism that is convex toward a back side, and is arranged in the vertical direction, with a longitudinal direction thereof being directed in the left-right direction. Each optical unit 332 is substantially like a trapezoid that is convex toward the back side in a cross-section parallel to the arrangement direction and orthogonal to the sheet surface. Each optical unit 332 has a top surface 333 that is substantially planar and slopes 334, 335 formed on both sides with respect to the top surface 333. For the sake of easy understanding, one slope positioned on the light incident surface 33a side is referred to as a first slope 334, and another slope positioned on the opposite surface 33b side is referred to as a second slope 335.

The top surface 333 is substantially parallel to a sheet surface of the light guide plate 13. Therefore, in the present embodiment, a dimension t from an apex of the prism 131 to the top surface 333 in a thickness direction of the light guide plate 33 is uniform regardless of a position in the arrangement direction. In the present embodiment, the dimension t is equal to 0.5 mm.

It may be preferable but not necessary that an angle α between the second slope 335 and the top surface 333 (sheet surface of the light guide plate 33) satisfies: 0.3 degrees ≤α≤3.0 degrees. In the present embodiment, the angle α is equal to 1.0 degree regardless of the position thereof in the arrangement direction (light guiding direction), satisfying the preferred range. An angle between the first slope 334 and the top surface 333 is also α, which is uniform regardless of the position thereof in the arrangement direction.

As a result, as in the first embodiment, a V-shaped groove between adjacent optical units 332 has a symmetric shape in the direction of arrangement of the optical units 332.

An interval P3 of arrangement of the optical units 332 of the present embodiment gradually increases from the light incident surface 33a to a center in the arrangement direction thereof, and gradually decreases from the center to the other light incident surface 32b. Therefore, in the arrangement direction of the optical units 332, the interval P3 is greater in the center and smaller on both sides, the light incident surface 33a, 33b sides.

In addition, in the direction of arrangement of the optical units 332, the width of the second slope 335 is greater than that of the first slope 334 from the light incident surface 33a to the center; and the width of the first slope 334 is greater than that of the second slope 335 from the center to the light incident surface 33b. Therefore, in the present embodiment, a shape of the reflective surface 33d of the light guide plate 33 is symmetric with respect to the center (a center point of the light guide plate 33 in the arrangement direction) in the direction of arrangement of the optical units 332.

It may be preferable but not necessary that the optical units 332 satisfy a ratio w/P3 of a dimension w of the top surface 333 to an interval P3 in the arrangement direction: 0.1≤w/P3≤0.8. In the optical units 232 of the present embodiment, the interval P3 is equal to 70 micron meters in the vicinity of the light incident surfaces 33a, 33b, the interval P3 is equal to 200 micron meters in the center in the arrangement direction, and the dimension w of the top surface 333 is equal to 40 micron meters. Accordingly, the ratio w/P3 is approximately equal to 0.57 in the vicinity of the light incident surfaces 33a, 33b and the ratio w/P3 is equal to 0.2 in the center in the arrangement direction, satisfying the preferred range.

According to the present embodiment, for a case where the two-lamp surface light source device 30 and the display apparatus 3 employ two light source units 32A, 32B, it is possible to render an amount of light exiting in the direction of arrangement of the optical units 332 of the light exit surface 13c to be further uniform. In this manner, the present embodiment provides the surface light source device 30 and the display apparatus 3 in which the convergence of light and the in-plane uniformity of brightness are increased. As a result, the display apparatus 3 provides a display of a high-quality image.

In addition, the present embodiment provides a superior surface light source device and display apparatus in which a reduction in thickness is realized and the Moire phenomenon does not occur.

FOURTH EMBODIMENT

Figure 8:
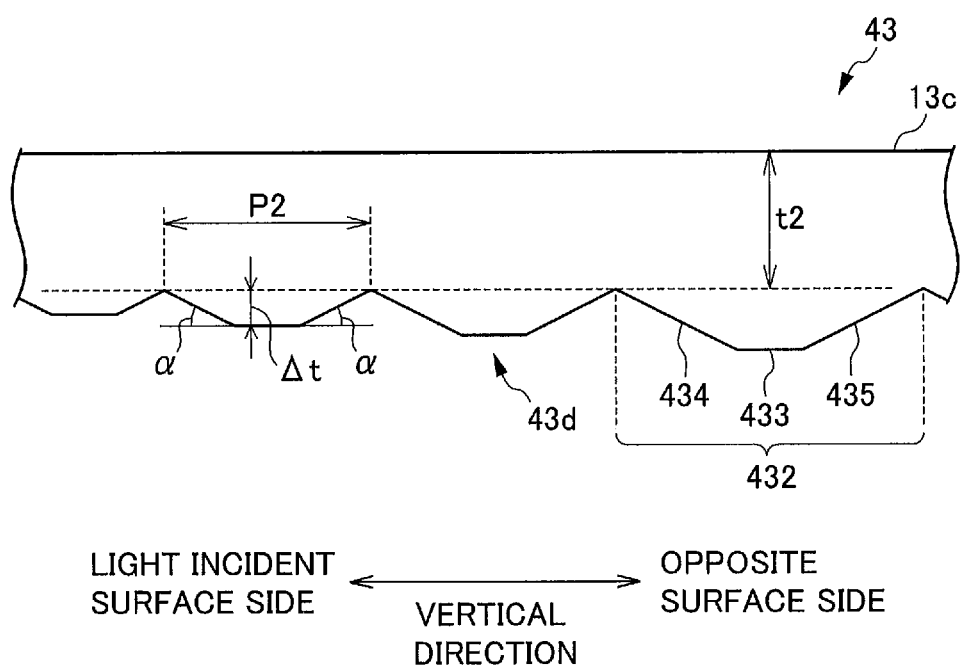
FIG. 8 is a diagram illustrating a light guide plate according to a fourth embodiment.

FIG. 8 is a diagram illustrating a shape of a light guide plate 43 according to a fourth embodiment. FIG. 8 illustrates a cross-section of the light guide plate 43 that is parallel to a vertical direction and orthogonal to a sheet surface.

The light guide plate 43 of the fourth embodiment is configured substantially similar to the light guiding plate 13 of the first embodiment, except that: a dimension t2 from an apex of a prism 131 to a bottom of a V-shaped groove between adjacent optical units 432 in a direction orthogonal to the sheet surface is constant; and a height Δt of an optical unit 432 increases from a light incident surface side to an opposite surface side in an arrangement direction. The light guide plate 43 may be used in the surface light source device 10 and the display apparatus 1 in place of the light guide plate 13 of the first embodiment. Therefore, portions with functions similar to the first embodiment are referred to by the same symbols or symbols bearing the same symbols in last part, and specific descriptions thereof are omitted accordingly.

The light guide plate 43 includes a light incident surface 13a, an opposite surface 13b, a light exit surface 13c, and a reflective surface 43d.

On the light exit surface 13c, a plurality of prisms 131 is arranged in a left-right direction.

A plurality of optical units 432 is arranged on the reflective surface 43d. Each optical unit 432 is shaped substantially like a quadratic prism that is convex toward a back side, and is arranged in a vertical direction, with a longitudinal direction thereof being directed in the left-right direction.

In the light guide plate 43, a dimension t2 from an apex of the prism 131 to a bottom of a V-shaped groove between adjacent optical units 432 in a direction orthogonal to a sheet surface is uniform. In the present embodiment, the dimension t2 is equal to 0.5 mm.

Each optical unit 432 includes a top surface 433 and slopes 434, 435. For the sake of easy understanding, one slope positioned on the light incident surface 13a side is referred to as a first slope 434, and another slope positioned on the opposite surface 13b side is referred to as a second slope 435.

The top surface 433, which is a top portion of the optical unit 432, is parallel to the sheet surface and the height Δt of convexity toward the back side increases as the optical unit 432 moves away from the light incident surface 13a. However, an angle α is sufficiently small and change in the height Δt of convexity is small. Since a change in a thickness of the light guiding plate 43 in a direction of arrangement of the optical units 432 is small, the light guide plate 43 can be considered to be substantially planar.

In addition, it may be preferable but not necessary that the angle α between the second slope 435 and the top surface 433 (sheet surface of the light guide plate 43) satisfies: 0.3 degrees ≤α≤3.0 degrees. In the present embodiment, the angle α is equal to 1.0 degree regardless of the position of an optical unit 432 in the arrangement direction (light guiding direction), satisfying the preferred range. An angle between the first slope 434 and the top surface 433 is also α, which is uniform regardless of the position of an optical unit 432 in the arrangement direction. As a result, the V-shaped groove between the optical units 432 has a symmetric shape in the direction of arrangement of the optical units 432, in similar to the first embodiment.

It may be preferable but not necessary that the optical units 432 satisfy a ratio w/P2 of a dimension w of the top surface 433 with respect to an interval P2 in the arrangement direction: 0.1≤w/P2≤0.8. In the optical units 432 of the present embodiment, the interval P2 is equal to 70 micron meters in the vicinity of the light incident surface 13a, the interval P2 is equal to 200 micron meters in the vicinity of the opposite surface 13b and the dimension w of the top surface is equal to 40 micron meters. Accordingly, the ratio w/P2 is approximately equal to 0.57 in the vicinity of the light incident surface 13a and the ratio w/P2 is equal to 0.2 in the vicinity of the opposite surface 13b, satisfying the preferred range.

A forming die for forming the optical units 432 may be produced by machining or the like.

Figure 9:
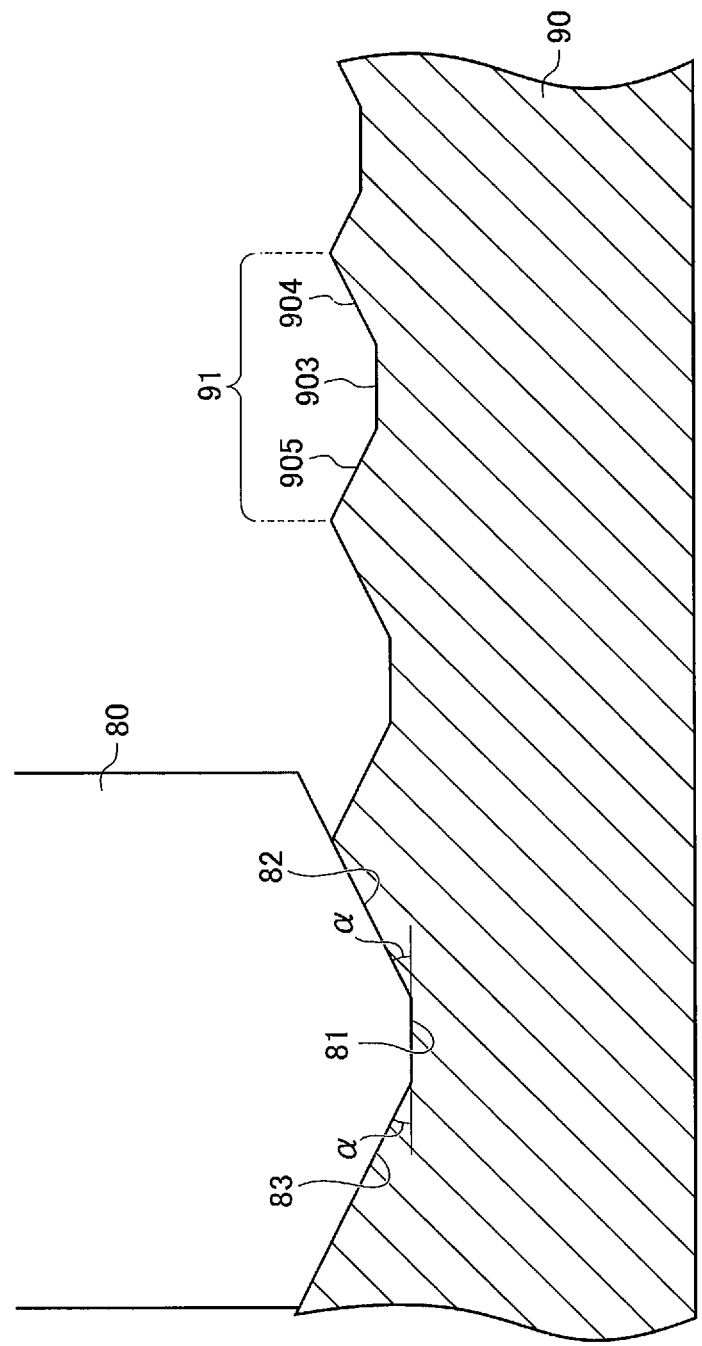
FIG. 9 is a diagram illustrating machining of a forming die.

FIG. 9 is a diagram illustrating machining of a forming die.

A concave-shaped die 91 for forming the optical units 432 is produced through machining of a forming die 90 with a tool bit 80 having a top face forming part 81 and slope forming parts 82, 83. An angle between the top face forming part 81 and the slope forming parts 82, 83 is equal to the angle α between the top surface 433 and the slopes 434, 435 of the optical units 432. The top face forming part 81 of the tool bit 80 forms a top surface 903 of the concave-shaped die 91 and the slope forming parts 82, 83 form slopes 904, 905 of the concave-shaped die 91.

By performing machining with the tool bit 80 while changing a depth of cutting and interval of arrangement, it is possible to easily produce the concave-shaped die 91 for forming the optical units 432. In addition, since only one tool bit 80 is sufficient and no additional process is required for forming diffusion patterns and the like, it is possible to produce the die easily and with low cost, resulting in a reduction in production costs of the light guide plate 43 and the like.

As described above, since the present embodiment allows the forming die for forming the optical units 432 to be produced by the same cutting tool while changing a depth of cutting and interval of arrangement, it is possible that the forming die is easily produced. As a result, it is possible to reduce production costs of the light guide plate 43 and enable the low-cost mass production of the light guide plate 43.

The present embodiment also provides the light guide plate 43 that not only makes an amount of exit light uniform in the light guiding direction (the direction of arrangement of the optical unit 432), but also renders the convergence of light to be high. Accordingly, the present embodiment provides the surface light source device and the display apparatus with the high in-plane uniformity of brightness and high front surface brightness.

Furthermore, as the light guide plate 43 of the present embodiment is substantially planar, it is possible to further reduce the thickness of the surface light source device 10 and the display apparatus 1.

In addition, the present embodiment also provides a superior surface light source device and display apparatus with the low generation of a Moire phenomenon.

Optical units like the optical units 232, 332 of the second and third embodiments may be applied to the light guide plate 43 of the present embodiment in which a total thickness varies due to a change in the height Δt of the optical units 432.

Modifications

The present invention is not limited to the above-described embodiments and can be modified and changed. Such modifications are also within the scope of the present invention.

(1) In the respective embodiments described above, the surface light source devices 10, 30 have been exemplified, in which the prism sheet 14, the light diffusive sheet 15 and the like are provided closer on the LCD panel 11 side (observation surface side) than the light guide plates 13, 23, 33, 43. However, the present invention is not limited thereto and it may alternatively be possible that other optical sheets, on which various lens shapes and prism shapes are formed, are disposed in combination on the light guide plate 13, 23, 33, 43 side or the LCD panel 11 side of the prism sheet 14, or a light diffusive sheet and the like are disposed on the back side (light guide plate side) or the LCD panel 11 side of the prism sheet 14. It may alternatively be possible that an optical sheet other than the prism sheet 14 is used and the light diffusive sheet is omitted.

It may be possible that various optical sheets used in combination with the light guide plate 13, 23, 33, 43 as the surface light source device 10, 30 are selected according to usage environment and the optical performance desired.

(2) In the respective embodiments, it may alternatively be possible that the light guide plates 13, 23, 33, 43 employ lenses shaped substantially like a half cylinder or a half oval cylinder on the light exit surface 13c instead of the prism 131. It may alternatively be possible that a combination of plurality of types of lenses is arranged in a multiple manner on the light exit surface of the light guide plate.

(3) In the respective embodiments, the reflector 16 is shaped like a parallel plate and is a separate component from the light guide plates 13, 23, 33, 43. However, the present invention is not limited thereto and it may be alternatively possible that the reflector 16 is integrally formed on the reflective surface side of the light guide plates 13, 23, 33, 43. In this case, it may be preferable but not necessary that the reflective surface of the reflector mainly specularly reflective.

The embodiments and modifications can be used in combination as appropriate; however, detailed description thereof is omitted herein. The present invention is not limited to the embodiments described above.

What is claimed is:

1. A light guide plate shaped substantially like a plate, comprising:
   a light incident surface on which light is incident;
   a light exit surface, which is substantially orthogonal to the light incident surface, configured to allow the light to exit; and
   a reflective surface, which is substantially orthogonal to the light incident surface and opposite to the light exit surface, configured to reflect the light toward the light exit surface, wherein
   a plurality of optical units is arranged along the reflective surface in a direction orthogonal to the light incident surface;

each of the optical units is shaped substantially like a quadratic prism convex toward the reflective surface and has a top surface and two slopes being opposite to each other with respect to the top surface;

a dimension of the top surface is configured to be constant in a direction of arrangement of the optical units; and an interval between an adjacent optical units becomes greater as the adjacent optical units lie further away from the light incident surface in the direction of arrangement of the optical units.

2. The light guide plate according to claim 1, wherein an angle between a slope of an optical unit on a side opposite to the light incident surface and a sheet surface of the light guide plate is no less than 0.3 degrees and no greater than 3.0 degrees, where the sheet surface extends horizontally with respect to the light guide plate.

3. The light guide plate according to claim 1, wherein a ratio of the dimension of the top surface in the direction of arrangement of the optical units to the interval between the adjacent optical units is no less than 0.1 and no greater than 0.8.

4. The light guide plate according to claim 1, wherein a plurality of prisms shaped substantially like a triangular prism is arranged on the light exit surface in a direction orthogonal to the direction of arrangement of the optical units.

5. A surface light source device comprising:
the light guide plate according to claim 1;
a light source unit disposed opposite to the light incident surface; and
a prism sheet provided on a light exit surface side of the light guide plate, a plurality of prisms that is convex toward the light guide plate being arranged on the prism sheet in a direction parallel to the direction of arrangement of the optical units.

6. The surface light source device according to claim 5, wherein
the light source unit is single;
a groove formed between the adjacent optical units is asymmetric in the direction of arrangement of the optical units; and
between the two slopes opposite to each other with respect to the top surface, one slope on the light incident surface side is smaller in dimension in the direction of arrangement of the optical units than another slope on an opposite side.

7. The surface light source device according to claim 5, further including another light source unit, wherein
a face of the light guide plate facing the light incident surface is another light incident surface;
the other light source unit is disposed opposite to the other light incident surface; and
a groove formed between the adjacent optical units is symmetric in the direction of arrangement of the optical units.

8. A transmissive display apparatus comprising:
the surface light source device according to claim 5; and
a transmissive display unit that is illuminated by the surface light source device from a backside thereof.

\* \* \* \* \*